United States Patent
Lee et al.

(10) Patent No.: US 7,272,502 B2
(45) Date of Patent: Sep. 18, 2007

(54) RFID TAG INSTALLATION SYSTEM USING A VEHICLE AND A METHOD THEREOF

(75) Inventors: Seung Yong Lee, Taejon (KR); Jong Hun Lee, Seoul (KR); Seong Baek Kim, Taejon (KR); Ji Hoon Choi, Taejon (KR); Byung Tae Jang, Taejon (KR); Kyoung Ho Choi, Taejon (KR)

(73) Assignee: Electronics and Telecommunication Research Institute, Taejon (KR)

( * ) Notice: Subject to any disclaimer, the term of this patent is extended or adjusted under 35 U.S.C. 154(b) by 195 days.

(21) Appl. No.: 10/786,302

(22) Filed: Feb. 26, 2004

(65) Prior Publication Data

US 2005/0065724 A1 Mar. 24, 2005

(30) Foreign Application Priority Data

Sep. 23, 2003 (KR) ............ 10-2003-0065862

(51) Int. Cl.
G01C 21/00 (2006.01)
(52) U.S. Cl. ............ 701/214; 701/207; 340/539.13; 340/572.8
(58) Field of Classification Search ............ 701/207, 701/213, 214; 342/357.06, 357.07; 340/10.1, 340/10.5, 539.1, 539.13, 686.1, 686.2, 572.1, 340/572.3, 572.4, 572.8
See application file for complete search history.

(56) References Cited

U.S. PATENT DOCUMENTS 6,233,523 B1 5/2001 Sood 6,526,352 B1 * 2/2003 Breed et al. ............ 701/213

(Continued)

FOREIGN PATENT DOCUMENTS

KR 1998-10935 4/1998

(Continued)

OTHER PUBLICATIONS

Naser El-Sheimy, "The Development of VISAT-A Mobile Survey System For GIS Applications", The University of Calgary, Sep. 1996, pp. i-175.

*Primary Examiner*—Gary Chin
(74) *Attorney, Agent, or Firm*—Lowe Hauptman Ham & Berner LLP

(57) ABSTRACT

The present invention relates to a radio frequency identification (RFID) tag installation system using a vehicle and method thereof. The REID tag is installed on the road to provide a driver with position information and road information such as speed limit, road name. etc in his or her traveling region. By using our present invention, RFID tag can be installed with small manpower in a short time. The system uses two CCD cameras, two GPS receivers, an INS and a DMI, and includes: a vehicle position and yaw extractor by using the two GPS receivers; orientation extractor for the vehicle by using INS, a GPS/INS/DMI integrator for GPS outage and for INS error correction; two cameras interior/exterior orientation extractor for the CCD cameras; a target position extractor for finding 3-dimensional coordinates; a road information storage for supplying road information such as a speed limit and a route number of a road; an REID tag writer for inputting the information obtained from the target region position extractor and the road information storage; and an REID tag installer for attaching the REID tag on the road.

5 Claims, 2 Drawing Sheets

U.S. PATENT DOCUMENTS

2005/0280538 A1* 12/2005 Kawai et al. ............ 340/572.1
2005/0285782 A1* 12/2005 Bennett ................. 342/357.07
2006/0055530 A1*  3/2006 Wang et al. ........... 340/539.13

FOREIGN PATENT DOCUMENTS

| KR | 1999-22751 | 7/1999 |
| KR | 2003-05749 | 1/2003 |

* cited by examiner

RFID TAG INSTALLATION SYSTEM USING A VEHICLE AND A METHOD THEREOF

BACKGROUND OF THE INVENTION

1. Field of the Invention

The present invention relates to a radio frequency identification (RFID) tag installation system using a vehicle and method thereof. RFID tag installation system of the present invention consists of a) two charge coupled device (CCD) cameras, b) two global positioning system (GPS) receivers, c) an inertial navigation system (INS), d) a distance measurement instrument (DMI), and e) an RFID tag writer and a tag installer. The system of the present invention acquires 3-dimensional coordinates (position) and road information, and stores them in a RFID tag in real time or a post-processing stage and then, RFID tag is installed on the road.

2. Description of the Related Art

Generally, in the RFID technique, a radio frequency is used to check entrance of men and something, position and classification of groups. A conventional RFID system employs a reader, a tag and a computer or other equipment that can process data. The reader receives a specific data from the tag, converts the data into a digital signal, verifies the converted digital signal and sends normal data to a computer or any other controller.

In the RFID technique, a user does not have to directly contact to a tag to recognize data or connect a connection cable to directly operate the conventional RFID system. It is the advantage of the RFID technique that such direct manipulations are not required.

Since no nonmetallic bodies shield electromagnetic waves, the reader can read data on the tag without failure even though the tag is hidden in a body or by bodies.

The RFID tag is installed on the road to supply driver's current position and road information to driver. Besides, the driver's position is sent for traffic situation analysis to the Traffic Control Center though wireless network installed in the vehicle.

Most of all, in order to input the position and road information to the RFID tag and install the RFID tag on the road, a measurement process to obtain precise position information is performed. It requires a lot of manpower and time

SUMMARY OF THE INVENTION

Accordingly, the present invention is directed to an RFID tag installation system using a vehicle and method thereof that substantially obviates problem due to limitations and disadvantages of the related art.

It is an object of the present invention to provide an RFID tag installation system using a vehicle and method thereof, which make it possible to install a RFID tag by only a few people in a short time. The RFID tag supplies precise position and road information. In order to realize the system and method of the present invention, used in the vehicle equipped with two CCD cameras, two GPS receivers, an INS, a DMI, an RFID tag writer and a tag installer. The vehicle obtains 3-dimentional coordinates and road information of RFID tag installed region in appearing images in real time, and stores them in a RFID tag to install the a RFID tag on the road.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the system includes: An RFID tag installation system using two CCD cameras, two GPS receivers, an INS, a DMI and a sensor synchronizer, being installed inside and outside of a vehicle, the system comprising:

- a vehicle position (x, y, z) and yaw extractor by using the two GPS receivers;
- an orientation (position, attitude) extractor for the vehicle by using INS;
- a GPS/INS/DMI integrator for GPS outage and for INS error correction in real time or in a post-processing stage;
- a camera interior/exterior orientation extractor for estimating lens distortion, focal length, principle point, and orientation of the CCD camera;
- a target position extractor for finding 3-dimensional coordinates of a road in which the RFID tag is installed;
- a road information storage for providing road information such as a speed limit and a rout number of a road in which the RFID tag is installed;
- a RFID tag writer for inputting 3-dimensional coordinates and road information to the RFID tag; and
- a RFID tag installer for installing the RFID tag on the road.

In another aspect of the present invention, in an RFID tag establishing method, a CCD camera, a GPS receiver, an INS, a DMI and a sensor synchronizer are used. The CCD camera, the GPS receiver, the INS and the DMI are installed inside and outside a vehicle. The method includes the steps of: calculating orientation of the vehicle by using GPS/INS/DMI integration in real time or post-processing (a);

(b) while the step (a) is performed, extracting camera interior/exterior orientation by using self-calibration;

(c) finding 3-dimensional coordinates of a road in which the RFID tag is installed region by using camera interior/exterior orientation extracted at the step (b), the vehicle orientation obtained at the step (a), and target region appearing in stereo images;

(d) inputting the road information supplied from a road information storage and the location information found at the step (c) to the RFID tag; and (e) Installing the RFID tag on the road, the RFID tag receiving the 3-dimensional coordinates and the road information at the step (d).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
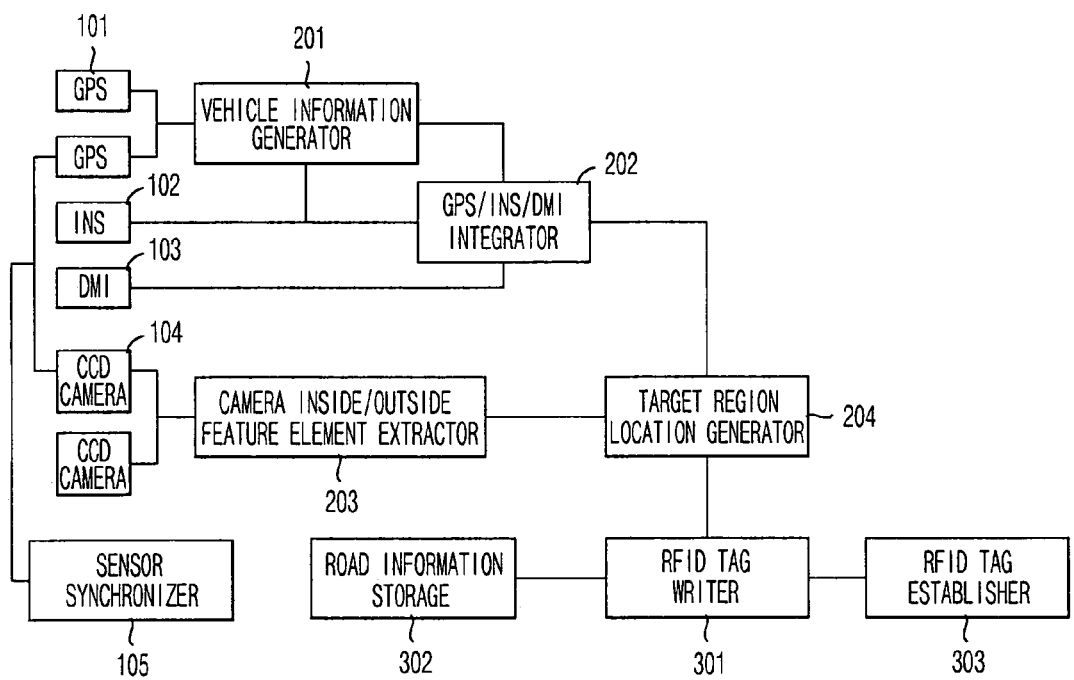
FIG. 1 illustrates architecture of an RFID tag installation system using a vehicle according to the present invention.

FIG. 1 illustrates architecture an RFID tag installation system using a vehicle according to the present invention.

Referring to FIG. 1, an RFID tag installation system is installed in a vehicle. The vehicle is equipped with two CCD cameras 104, two GPS receivers 101, an INS 102 and a DMI 103. The RFID tag installation system includes a vehicle position and yaw extractor 201, a GPS/INS/DMI integrator 202, two cameras interior/exterior orientation extractor 203, a target position extractor 204, a road information storage 302, an RFID tag writer 301, and an RFID tag installer 303.

The two CCD cameras 104 are installed outside the vehicle and supply image information of the RFID tag installed region. two GPS receivers 101 receive vehicle information such as position and yaw of the vehicle when the CCD camera 104 obtains image information. The INS 102 determines attitude (roll, pitch and yaw) of the vehicle when the CCD camera 104 obtains image information. The DMI 103 supplies correction information to the GPS receiver 101 and the INS 102 in case of GPS signal outage.

The vehicle position and yaw extractor 201 calculates vehicle information such as yaw, position and attitude of the vehicle by using the position information of the vehicle obtained by two GPS receivers. The GPS/INS/DMI integrator 202 integrates the GPS receiver 101, the INS 102 and the DMI 103, and provides the position and the attitude of the vehicle in real time or a post-processing stage with reference to the vehicle information supplied from the vehicle position and yaw extractor 201. The two cameras interior/exterior extractor 203 corrects camera distortion information of original image information obtained by the CCD camera, calculates focal length, principle point, a position, and an attitude of the each CCD camera 104. The target region position extractor 204 finds 3-dimensional coordinates of the RFID tag installed region by using image information obtained by the camera interior/exterior orientation extractor 203 and the vehicle information obtained by the GPS/INS/DMI integrator 202. The road information storage 302 stores road information such as speed limit and rout number of a road on which the RFID tag is installed. The RFID tag writer 301 inputs the position information calculated by the target region position extractor 204 and the road information obtained by the road information storage 302 to the RFID tag. The RFID tag installer 303 installs the RFID tag on the road. The RFID tag receives the position information and the road information from the RFID tag writer 301.

The RFID tag is attached to a screw, a nail or a reflection plate, receives the position and the road information from the RFID tag writer 301, and installed on the road.

Figure 2:
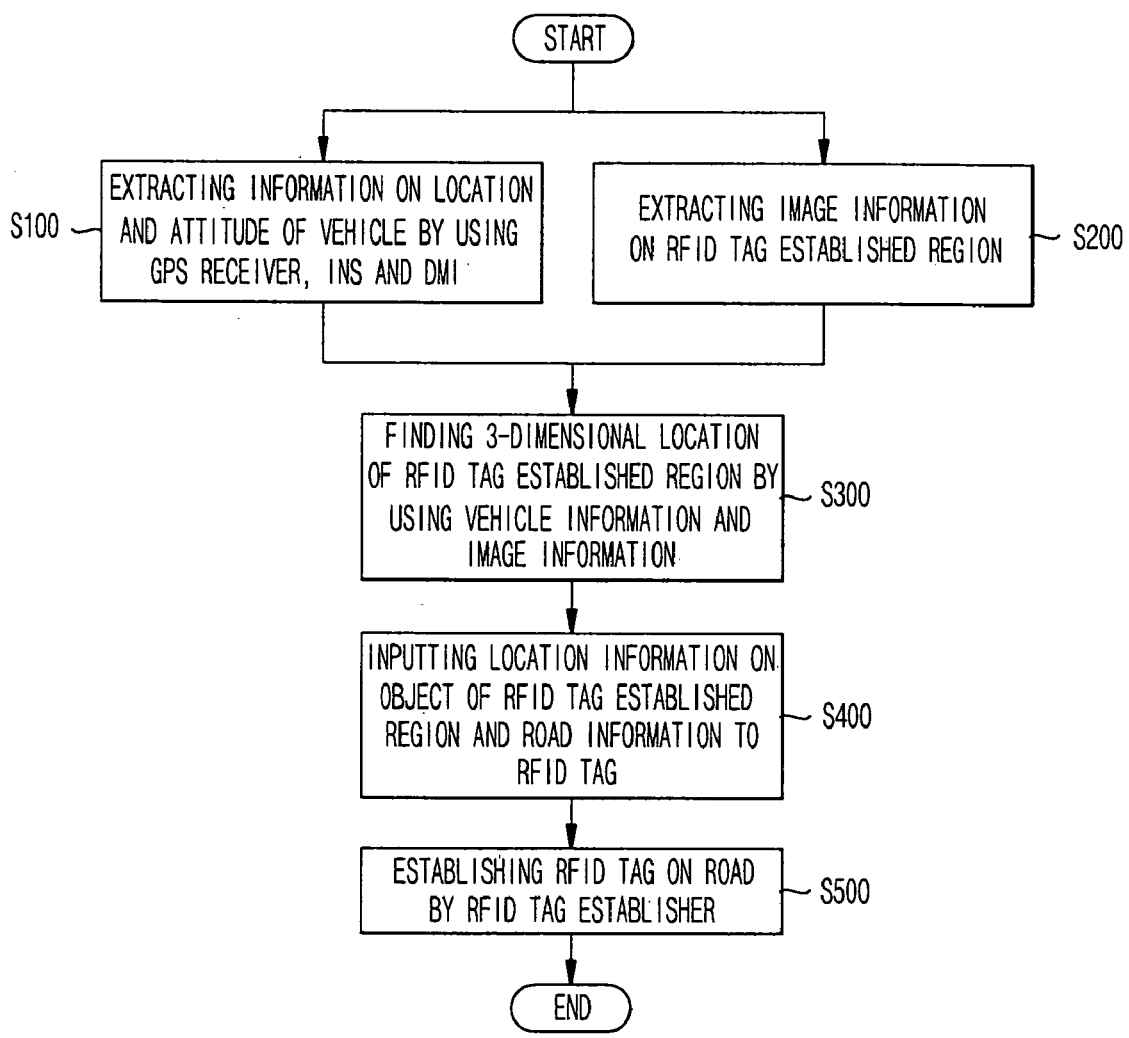
FIG. 2 is a flowchart of an RFID tag installation method using a vehicle according to the present invention.

FIG. 2 is a flowchart of an RFID tag installation method using a vehicle according to the present invention. Description will be made on a method for establishing an RFID tag by using a vehicle equipped with two CCD cameras, two GPS receivers, an INS, a DMI and a sensor synchronizer.

As described above, The position and attitude of moving RFID tag installation RFID tag installation system are calculated.(S100).

At the same time, the interior/exterior orientation of the each CCD camera are calculated by camera self-calibration method (S200).

Then, the orientation of each CCD camera of moving RFID tag installation RFID tag installation system is estimated by combining position and attitude of CCD with GPS/INS/DMI data (S300).

Finds 3-dimensional position of the RFID tag installed region by using above parameters and stereo images (S400).

The RFID tag is attached to a body such as a screw, a nail or a reflection plate installed by on the road (S500).

The 3-dimentional position and the road information are inputted by RFID writer.(S600).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An RFID tag installation system using two CCD cameras, two GPS receivers and an INS, being installed inside and outside of a vehicle, the system comprising:
  a vehicle position (x, y, z) and yaw extractor using the two GPS receivers;
  an orientation (position, attitude) extractor for the vehicle using the INS;
  a GPS/INS integrator for INS error correction in real time or a post-processing stage;
  a camera interior/exterior orientation extractor for estimating lens distortion, focal length, principle point, and orientation of the CCD camera;
  a target position extractor for finding 3-dimensional coordinates of a road in which the RFID tag is installed using images from the two CCD cameras and data from the GPS/INS integrator;
  a road information storage for providing road information including a speed limit and a route number of a road in which the RFID tag is installed;
  a RFID tag writer for inputting the 3-dimensional coordinates and road information to the RFID tag; and
  a RFID tag installer for installing the RFID tag on the road.

2. The system of claim 1, wherein the RFID tag is attached to a screw, a nail or a reflection plate, thereby installed on the road.

3. An RFID tag installing method using two CCD cameras, two GPS receivers and an INS, being installed inside and outside a vehicle, the method comprising the steps of:
  (a) calculating orientation of the vehicle by using GPS/INS integration in real time or in a post-processing stage;
  (b) while the step (a) is performed, extracting camera interior/exterior orientation by using self-calibration;
  (c) finding 3-dimensional coordinates of a road in which the RFID tag is installed by using the camera interior/exterior orientation extracted at the step (b), the vehicle orientation obtained at the step (a), and target region appearing in stereo images;
  (d) inputting the road information supplied from a road information storage and the 3-dimensional coordinates of the road found at the step (c) to the RFID tag; and
  (e) installing the RFID tag on the road.

4. The method of claim 3, wherein, in the step (d), the road information and the 3-dimensional coordinates are converted into a format for an RFID tag writer and inputted to the RFID tag.

5. The method of claim 3, wherein, in the step (e), the RFID tag is attached to a screw, a nail or a reflection plate, and the screw, the nail or the reflection plate is installed on the road.

* * * * *

UNITED STATES PATENT AND TRADEMARK OFFICE
CERTIFICATE OF CORRECTION

| | |
|---|---|
| PATENT NO. | : 7,272,502 B2 |
| APPLICATION NO. | : 10/786302 |
| DATED | : September 18, 2007 |
| INVENTOR(S) | : Seung Yong Lee et al. |

It is certified that error appears in the above-identified patent and that said Letters Patent is hereby corrected as shown below:

Title page, item (73) "Electronics and Telecommunication Research Institute" should be -- Electronics and Telecommunications Research Institute --

Signed and Sealed this

Eighth Day of April, 2008

JON W. DUDAS
*Director of the United States Patent and Trademark Office*